Patented Mar. 11, 1952

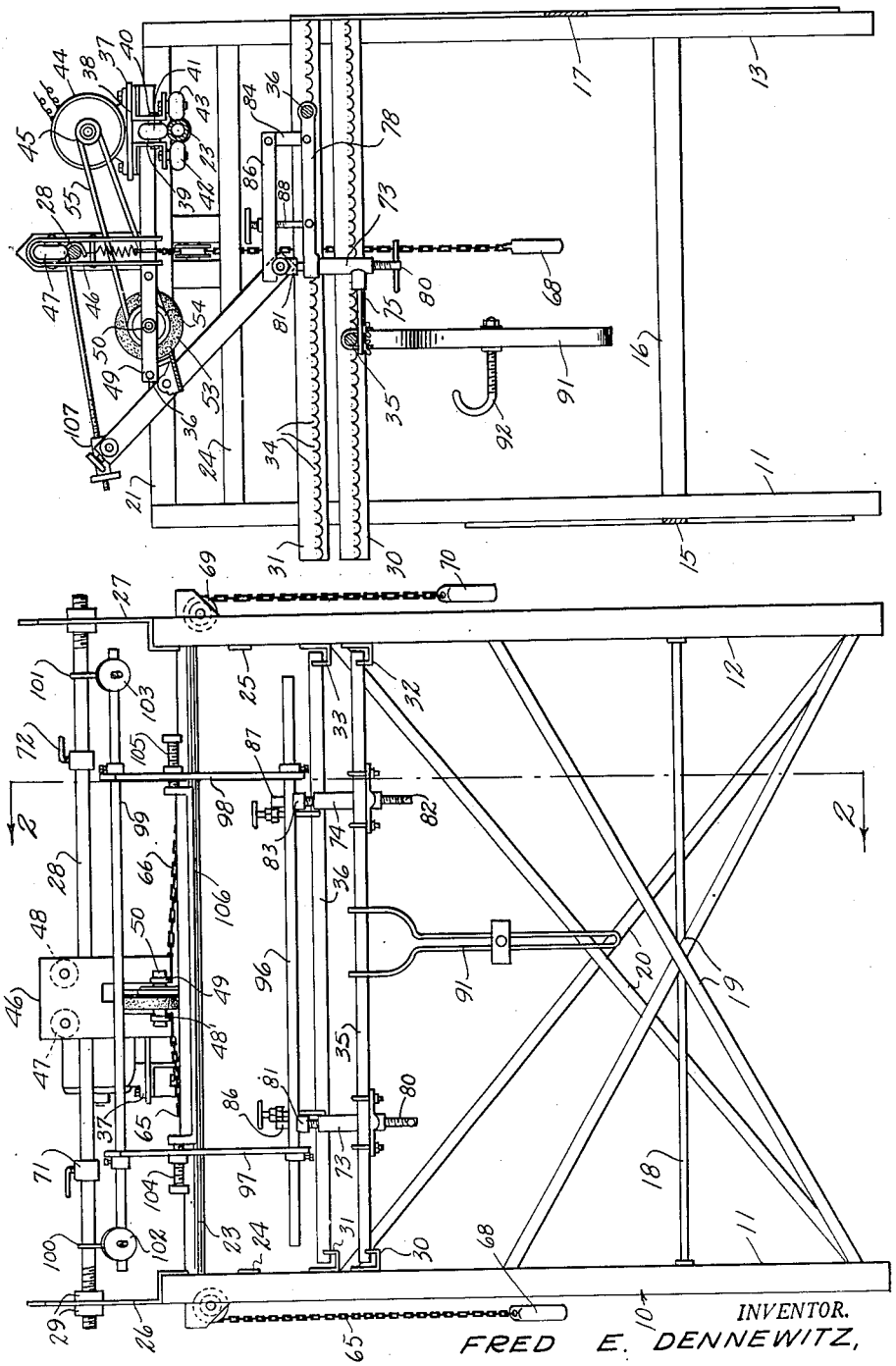

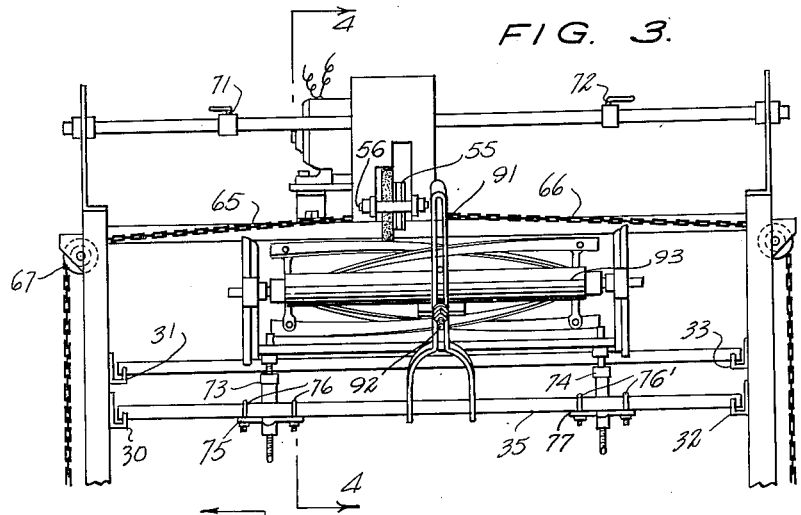
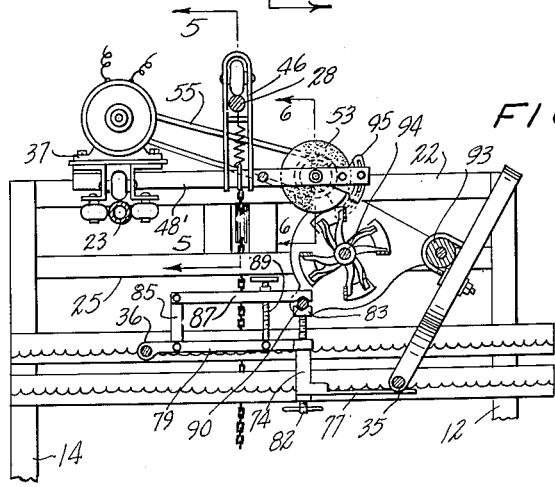
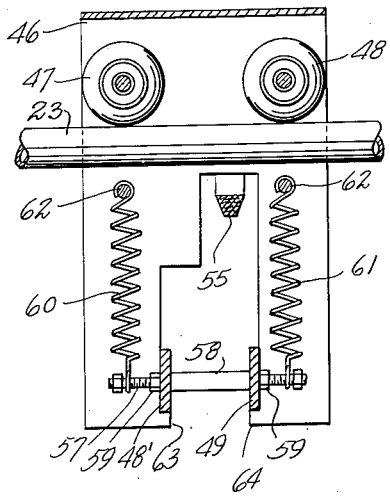
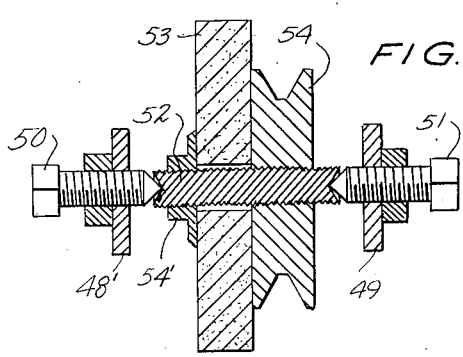

2,588,492

UNITED STATES PATENT OFFICE 2,588,492

LAWN MOWER SHARPENING MACHINE

Fred E. Dennewitz, Forrest, Ill.

Application May 5, 1950, Serial No. 160,295

2 Claims. (Cl. 51—34)

This invention relates to lawn mower sharpening machines, and more particularly to a machine utilizing a motor-driven grinding wheel for sharpening both the reel blades and cutter bars of lawn mowers.

It is among the objects of the invention to provide an improved machine for sharpening lawn mowers, which machine supports the lawn mower reel and associated mechanism with the reel in an accurately adjusted position and supports a motor-driven grinding wheel for straight line movements longitudinally of the blades of the lawn mower reel to accurately grind the cutting edges of such blades, which includes guides for the grinding wheel to accurately determine the angle and depth of cut made by the grinding wheel on the cutting edges of the blades, which also supports a lawn mower cutter bar in proper position for grinding by the same grinding wheel used to grind the reel blades, which will quickly and accurately grind the reel blades and cutter bar of a lawn mower, and which is simple and durable in construction, positive and accurate in operation, and easy to use.

Other objects and advantages will become apparent from a consideration of the following description and the appended claims in conjunction with the accompanying drawings, wherein:

Figure 1 is a front elevational view of a lawn mower sharpening machine illustrative of the invention;

Figure 2 is a cross-sectional view on the line 2—2 of Figure 1;

Figure 3 is a front elevational view of the upper portion of the machine with a lawn mower reel mounted in operative position in the machine;

Figure 4 is a cross-sectional view on the line 4—4 of Figure 3;

Figure 5 is a cross-sectional view on an enlarged scale of a fragmentary portion of the machine taken on the line 5—5 of Figure 4; and Figure 6 is a cross-sectional view on an enlarged scale of a fragmentary portion of the machine taken on the line 6—6 of Figure 4.

With continued reference to the drawings, the machine comprises a rectangular frame, generally indicated at 10, having four upright legs or posts 11, 12, 13 and 14 formed of suitable material, such as angle iron. The legs or posts are held in spaced apart and substantially parallel relationship to each other by suitable transverse frame members, as indicated at 15, 16, 17 and 18 in Figures 1 and 2, and are reinforced by diagonal braces, as indicated at 19 and 20.

End members 21 and 22, which may also be conveniently formed of angle iron, are disposed at the top of the frame, the end member 21 connecting the upper end of the two posts 11 and 13 and the end member 22 connecting the upper ends of the two posts 12 and 14. A tubular rail 23 extends longitudinally of the frame at the upper end of the latter and is rigidly secured at its opposite ends to the end members 21 and 22 intermediate the length of such end members. A secondary end member 24 extends between the posts 11 and 13 below and substantially parallel to the top end member 21 and a secondary end member 25 extends between the posts 12 and 14 below and substantially parallel to the top end member 22. A bracket 26, in the form of a heavy metal strap, is secured to the end member 21 and extends upwardly therefrom at a location between the rail 23 and the front side of the frame, and a similar bracket 27 is secured to and extends upwardly from the top end member 22 at a corresponding location. A second or upper rail 28 extends at its ends through apertures provided in the brackets 26 and 27 and is rigidly secured to these brackets by pairs of clamp nuts 29 threaded onto the screw-threaded end portions of the second rail.

The second rail 28 is disposed somewhat above and forwardly of the rail 23 and the two rails are substantially parallel to each other.

Two notched racks 30 and 31 are secured to the inner sides of the posts 11 and 13 below and substantially parallel to the secondary end member 24, the rack 30 being disposed below and substantially parallel to the rack 31. Two similar racks 32 and 33 are secured to the inner sides of the posts 12 and 14 below and substantially parallel to the secondary end member 25 with the rack 32 disposed below and substantially parallel to the rack 33.

Each of these racks is an elongated member of channel-shaped cross-section having one flange secured to the corresponding frame posts and its other flange shorter than the one flange and provided with a series of contiguous, semi-circular notches 34 extending along the edge thereof. A rod 35 extends longitudinally of the frame and is supported at its opposite ends in notches of the two lower racks 30 and 32, this rod being adjustably movable between the rear and front sides of the machine by selection of the notches in which the ends of the rod are supported. A second rod 36 is supported at its opposite ends in the notches of the upper racks 31 and 33, the position of this rod transversely of the frame being also adjustable by selection of the notches in the upper racks in which the ends of the rod are supported.

A motor carriage 37 is mounted on the rail 23 for movement longitudinally of this rail. This carriage comprises a top plate 38 disposed substantially parallel to the plane of the top of the frame and two channel members 39 and 40 disposed below the plate 38 with their web portions mutually opposed and in spaced apart, substantially parallel relationship to each other. The upper flanges of the channel members 39 and 40 are secured to the under side of the plate 38 and the lower flanges are positioned adjacent the rail 23. Two sets of rollers with three rollers in each set are positioned one set at each end of the carriage for supporting the carriage on the rail 23. The three rollers in each set include a center roller 41 disposed between the web portions of the channel members 39 and 40 and rotatable about a substantially horizontal axis. The two upper rollers of the two sets rest on the top of the rail 23 and support the weight of the motor and the motor carriage. Each set of rollers also includes two rollers 42 and 43 rotatable about substantially vertical axes and bearing against the rail 23 at respectively opposite sides of the latter for guiding the motor carriage along the rail.

An electric motor 44 is mounted on the upper surface of the plate 38 of the carriage and a belt pulley 45 is secured on one end of the motor shaft.

A U-shaped grinding wheel carriage 46 is mounted on the rail 28 for movement longitudinally of this rail. Two rollers 47 and 48 are journaled in this carriage near the closed end or bight thereof and rest on the top of the rail 28 and the two legs of this U-shaped carriage depend downwardly from the rail 28. The leg portions of the carriage 46 are provided with registering, rectangular openings and two flat bars 48' and 49 are secured, each at one end, to the channel member 39 of the motor carriage and extend through the openings in the grinding wheel carriage 46, in spaced apart and substantially parallel relationship to each other, to the side of the grinding wheel carriage 46 remote from the motor carriage.

At the side of the grinding wheel carriage 46 remote from the motor carriage, the two arms 48' and 49 are provided with registering tapped holes and set screws or bearing screws 50 and 51 are threaded through the tapped holes in the bars 48' and 49, respectively, and have pointed inner ends. An externally screw-threaded grinding wheel axle 52 is provided in its ends with conical depressions in which the pointed inner ends of the bearing screws 50 and 51 engage to rotatably support this axle between the bars 48' and 49.

A disc-shaped grinding wheel 53 has a central aperture receiving the axle 52 and a belt pulley 54 is threaded onto the axle at one side of the grinding wheel. A clamp nut 54' is threaded onto the axle at the opposite side of the grinding wheel to clamp the wheel against the pulley and rigidly secure the wheel to axle 52 for rotation with the pulley. A V-belt 55 extends through the openings in the legs of the carriage 46 and drivingly connects the motor-carried belt pulley 45 to the wheel-carried belt pulley 54. The ends of the bars 48' and 49 remote from the angle member 39 are held in spaced apart relationship by a pin or bolt 56 extending through registering apertures in the bars at the corresponding ends thereof and a spacer sleeve surrounding the bolt between the two bars. The bars are also secured in spaced apart relationship by a bolt 57 which extends through registering apertures in the bars between the two legs of the carriage 46 and a spacer sleeve 58 surrounding the bolt 57 between the bars. Nuts 59 threaded onto the bolt clamp the bars against the opposite ends of the spacer sleeve and the bolt extends outwardly of both of the bars 48' and 49. Tension springs 60 and 61 are secured at their lower ends to the respectively opposite ends of the bolt 57 and at their upper ends to the carriage 46 by suitable pins 62 and tend to resiliently lift the bars 48' and 49 and the grinding wheel 53.

One of the legs of the carriage 46 is provided at its lower end with projections 63 and 64 extending inwardly of the rectangular opening in this leg of the carriage, which projections engage the bottom edges of the bars 48' and 49, respectively, and limit downward movement of these bars and the grinding wheel.

The bars 48' and 49 interconnect the motor carriage 37 and the grinding wheel carriage 46 so that the two carriages move together longitudinally of the rails 23 and 28.

Flexible strands, such as the chains 65 and 66, are connected, each at one end, to the carriage 46 at respectively opposite sides of the latter and extend in opposite directions away from the carriage 46 toward the ends of the frame. The chain 65 is carried over a sheave 67 supported on the end member 21 of the frame and depends at the outer side of this end of the frame. A weight 68 is connected to the depending end of the chain 65. The chain 66 is carried over a sheave 69 carried by the end member 22 of the frame and depends at the corresponding side of the frame, and a weight 70 is secured to the depending end of this chain. The two weights 68 and 70 facilitate the movement of the motor carriage and grinding wheel carriage with the motor and grinding wheel longitudinally of the rails 23 and 28.

Adjustable stops 71 and 72 are mounted on the rail 28 to limit the range of movement of the carriage 46 longitudinally of this rail.

A fixture for supporting a lawn mower reel and the associated lawn mower mechanism on the rods 35 and 36 is provided, and comprises two internally screw-threaded, tubular sleeves 73 and 74. The sleeve 73 has a bifurcated arm 75 extending perpendicularly therefrom, and disposed at its outer ends below the rail 35. This arm is secured to the rail 35 by two U-bolts 76. The sleeve 74 has a bifurcated arm 77 extending perpendicularly therefrom and secured to the rail 35 by two U-bolts 76'. An arm 78 extends perpendicularly from the top end of the sleeve 73 in the direction opposite the arm 75 and is provided at its end remote from the sleeve with an eye receiving the rod 36. The sleeve 74 is similarly provided with an arm 79 which extends perpendicularly from the upper end of the sleeve 74 in a direction opposite the arm 77 and is provided at its end remote from the sleeve with an eye which also receives the rod 36. A screw shaft 80 is threaded through the sleeve 73 and provided on its upper end with a head 81 having a V-shaped notch therein and a screw shaft 82 is threaded through the sleeve 74 and provided on its upper end with a notched head 83. An arm 84 extends upwardly from the arm 78 near the rod 36 and a similar arm 85 extends upwardly from the arm 79 also adjacent the rod 36. A lever 86 is pivotally connected at one end to the upper end of the arm 84 and is provided in its opposite end with a V-shaped notch which is opposed to the notch in the screw shaft head 81. A lever 87 is pivotally secured at one end to the upper end of the arm 85 and is provided near its opposite end with a notch which opposes the notch in the screw shaft head 83. Clamp screws 88 and 89 extend through the levers 86 and 87, respectively, and are threadedly engaged with the arms 78 and 79 to force the notched ends of the levers 86 and 87 toward the screw shaft heads 81 and 83.

With this arrangement, the cross rod 90 of a lawn mower assembly may be clamped on the heads 81 and 83 of the screw shafts by the levers 86 and 87 to position the reel blades of the lawn mower adjacent the grinding wheel 53.

A U-shaped lever 91 is pivotally mounted at one end on the rod 35 between the sleeves 73 and 74 and carries a bolt or pin 92 which is adjustable longitudinally of this lever. When the lever is swung up to the position illustrated in Figure 3, the bolt 92 is engaged under the roller 93 of the lawn mower assembly to hold the lawn mower reel 94 in proper position for grinding of the reel blades, as is particularly illustrated in Figure 4.

A guide or gauge 95 is carried by the bar 48' at the outer side of the grinding wheel 53 in position to rest upon a lawn mower blade being ground and to move the blade rotationally so that it follows the grinding wheel in the movements of the latter longitudinally of the frame and to also limit the depth of the cut made by the grinding wheel on the cutting edge of the blade. This guide or gauge is adjustable relative to the bars for varying the depth of cut to be made.

The various components of the grinding machine can be adjusted so that the machine will accommodate substantially any size and style of lawn mower reel.

When it is desired to grind the cutter bar of a lawn mower, a fixture is used, as particularly illustrated in Figures 1 and 2.

This fixture comprises an elongated rod 96 clamped on the heads 81 and 83 by the levers 86 and 87 and two flat links 97 and 98 secured each at one end to the rod 96 at spaced apart locations on the latter. A second rod or shaft 99 is secured to the links 97 and 98 at the ends thereof remote from the rod 96 and is substantially parallel to the rod or shaft 96. Hooks 100 and 101 are hooked over the rail 28 near the respectively opposite ends of this rail and extend through sleeves, as indicated at 107, mounted on shaft 99 and are adjustably connected to the shaft 99 near the correspondingly opposite ends of this shaft by hand knobs 102 and 103 threaded onto the screw-threaded end portions of the hooks 100 and 101, respectively at the ends of sleeves 107 remote from shaft 28.

The links 97 and 98 are provided intermediate their length with tapped holes, and set screws 104 and 105 are threaded through these holes and are engageable at their inner ends with the ends of a lawn mower cutter bar 106 positioned between the links 97 and 98, to hold the cutter bar in position for sharpening by the grinding wheel 53, as clearly illustrated in Figures 1 and 2.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A lawn mower sharpening machine comprising a rectangular frame having a top end, two rails extending across said frame in spaced apart and substantially parallel relationship to each other, one of said rails being disposed at the top end of said frame and connected at its ends thereto and the other of said rails being disposed above the top end of said frame, brackets secured to said frame at the upper end thereof and extending upwardly therefrom supporting said other rail, a first carriage mounted on said one rail for movement longitudinally thereof, a second carriage mounted on said other rail for movement longitudinally thereof, said second carriage having an opening therethrough, a pair of arms secured to said first carriage and projecting through the opening in said second carriage, means resiliently supporting said arms from said second carriage, a grinding wheel disposed between said arms and journaled thereon at the side of said second carriage remote from said first carriage, a motor mounted on said first carriage, means drivingly connecting said motor to said grinding wheel, and a fixture adjustably mounted on said frame for supporting lawn mower blades in position to be ground by said grinding wheel.

2. A lawn mower sharpening machine comprising a rectangular frame having a top end, two rails extending across said frame in spaced apart and substantially parallel relationship to each other, one of said rails being disposed at the top end of said frame and connected at its ends thereto and the other of said rails being disposed above the top end of said frame, brackets secured to and extending upwardly from the upper end of said frame supporting said other rail, a first carriage mounted on said one rail for movement longitudinally thereof, a second carriage mounted on said other rail for movement longitudinally thereof, said second carriage having an opening therethrough, a pair of arms secured to said first carriage and projecting through the opening in said second carriage, a grinding wheel disposed between said arms and journaled thereon at the side of said second carriage remote from said first carriage, a motor mounted on said first carriage, means drivingly connecting said motor to said grinding wheel, and a fixture adjustably mounted on said frame for supporting lawn mower blades in position to be ground by said grinding wheel, said second carriage comprising a U-shaped body receiving said other rail and having spaced apart and substantially parallel legs depending at respectively opposite sides of said other rail, two rollers journaled in said body at the closed end thereof and bearing on the top of said other rail, springs in said body connected between said body and said arms suspending said arms from said body, and stop means on said body limiting downward movement of said arms relative to said second carriage.

FRED E. DENNEWITZ.

(References on following page)

REFERENCES CITED

The following references are of record in the file of this patent:

UNITED STATES PATENTS

| Number | Name | Date |
|---|---|---|
| 805,127 | Fetters | Nov. 21, 1905 |
| 908,142 | Root | Dec. 29, 1908 |
| 938,494 | Kyle | Nov. 2, 1909 |
| 949,723 | Barnard | Feb. 15, 1910 |
| 956,237 | Warner | Apr. 26, 1910 |
| 963,964 | Warner | July 12, 1910 |
| 1,389,588 | Klay | Sept. 6, 1921 |
| 1,409,641 | Anderson | Mar. 14, 1922 |
| 1,888,572 | Root | Nov. 22, 1932 |
| 2,142,669 | Carpenter | Jan. 3, 1939 |
| 2,149,774 | Ingleman | Mar. 7, 1939 |
| 2,187,289 | Utterback | Jan. 16, 1940 |
| 2,281,055 | Smith | Apr. 28, 1942 |
| 2,466,905 | Machovec | Apr. 12, 1949 |
| 2,493,619 | Comstock | Jan. 3, 1950 |